(12) United States Patent
Östman et al.

(10) Patent No.: US 6,529,494 B1
(45) Date of Patent: Mar. 4, 2003

(54) DOWNLINK TIMESLOT POWER CONTROL IN A TIME DIVISION MULTIPLE ACCESS SYSTEM

(75) Inventors: Thomas Östman, Spånga (SE); Gunnar Monell, Solna (SE); Bo Hagerman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/399,764

(22) Filed: Sep. 21, 1999

(51) Int. Cl.[7] .................................................. H04J 3/00
(52) U.S. Cl. .................... 370/337; 370/347; 455/522; 455/63
(58) Field of Search ............................... 370/311, 318, 370/328, 329, 321, 337, 347, 442; 455/522, 436, 504, 506, 517, 62, 63

(56) References Cited

U.S. PATENT DOCUMENTS

| | | | | |
|---|---|---|---|---|
| 5,623,486 A | * | 4/1997 | Dohi et al. ................. | 370/311 |
| 5,634,206 A | * | 5/1997 | Reed et al. ................. | 455/135 |
| 5,751,763 A | * | 5/1998 | Bruckert ..................... | 370/342 |
| 5,838,673 A | | 11/1998 | Ritz et al. | |
| 6,072,792 A | * | 6/2000 | Mazur et al. ............... | 370/345 |
| 6,226,525 B1 | * | 5/2001 | Boch et al. ................. | 455/504 |
| 6,249,683 B1 | * | 6/2001 | Lundby et al. ............. | 455/419 |
| 6,411,817 B1 | * | 6/2002 | Cheng et al. ............... | 370/318 |

FOREIGN PATENT DOCUMENTS

WO       93/21700       10/1993

* cited by examiner

*Primary Examiner*—Dwayne Bost
*Assistant Examiner*—Sonny Trinh

(57) ABSTRACT

In a time division multiple access (TDMA) based cellular radio telecommunications system, system performance is improved by adjusting the transmit power associated with certain downlink signals during a corresponding timeslot, and in such a way that the power adjustment resembles that of a typical fading event, in terms of both time of occurrence and rate of occurrence (e.g., dB per msec). During the same timeslot, the transmit power associated with other downlink signals is maintained at a substantially constant level. More particularly, the transmit power associated with a downlink signal is maintained at a substantially constant level if the power level does not sufficiently provide adequate signal quality for the corresponding mobile station in the presence of fading. In contrast, the transmit power associated with a downlink signal may be adjusted (e.g., attenuated) is such a way that it resembles that of a typical fading event if the transmit power associated with the downlink signal provides more than adequate signal quality for the corresponding mobile station, despite the power level adjustment and the presence of fading.

26 Claims, 7 Drawing Sheets

DOWNLINK TIMESLOT POWER CONTROL IN A TIME DIVISION MULTIPLE ACCESS SYSTEM

FIELD OF INVENTION

The present invention generally relates to the field of radio telecommunications. However, the present invention more particularly relates to downlink power level control in a time division multiple access (TDMA) based radio telecommunications system.

BACKGROUND

In a radio telecommunications system, such as a cellular radio telecommunications system, any one of several access strategies may be employed, for example, frequency division multiple access (FDMA), code division multiple access (CDMA), or time division multiple access (TDMA). In an FDMA based system, the frequency spectrum is divided into a number of disjunctive frequency bands, where each band serves as a separate radio channel. In a system that employs CDMA, different modulation or spreading codes are used to distinguish the various radio channels.

In a TDMA based system, however, the time domain is divided into time frames. Each time frame is then further divided into a number of timeslots. Thus, each carrier frequency-timeslot combination constitutes a different physical channel, over which, a communications signal burst can be transmitted. In a cellular radio telecommunications system, a communications signal burst transmitted from a mobile station to a corresponding radio base station is referred to as an uplink burst. In contrast, a communications signal burst transmitted from the radio base station to the mobile station is referred to as a downlink burst.

In regard to the present invention, power control refers to the ability to modify or adjust the power levels associated with communications signal bursts, particularly, downlink communications signal bursts. Although the ability to modify or adjust power level is important because it helps to insure that the signal quality associated with a given channel is adequate, the ability to modify or adjust power level is, more generally, important because it helps to improve the spectral efficiency of the system as a whole by balancing average, system-wide signal quality and system capacity.

In accordance with the interim standards for TDMA IS-136A and IS-136B, the transmission power level associated with a downlink burst must remain constant during a given time frame. Thus, a mobile station receiving a downlink burst during a given timeslot expects the power level of the received burst to be constant, or nearly constant, over the timeslot. Despite this, the power level of the received downlink burst is not always constant.

In actuality, mobile radio signal transmissions are commonly subject to short term amplitude variations known as Rayleigh fading. For example, in a 1900 MHz system, a mobile station operating in a car traveling at 100 kilometers per hour experiences, on average, fading dips at a frequency of approximately 150 Hz. Since each timeslot is approximately 6.67 msecs in duration, which corresponds to a frequency of approximately 150 MHz, at least one fading dip can be expected during each timeslot.

While the transmit power level associated with one downlink burst may be more than sufficient to insure adequate signal quality, even if the signal is affected by a fading dip, the transmit power level associated with another downlink burst, particularly one being transmitted to a mobile station operating at or near the cell border, may not be sufficient to insure adequate signal quality if the signal is affected by a fading dip. For instance, if the signal associated with a given downlink burst is adversely affected by fading, the power level of the received signal may drop significantly, such that, the signal is extremely susceptible to co-channel interference, and to a lesser extent, adjacent channel interference, which may, in turn, render the quality of the signal unacceptable. Accordingly, an effective power control technique for TDMA based telecommunications systems is needed, whereby the power level of a given communications signal can be adjusted or modified during the course of a single timeslot so as to mask or reduce interference.

SUMMARY OF THE INVENTION

The present invention provides an effective power level control technique for use in TDMA based telecommunications systems, whereby the transmit power associated with certain downlink bursts, particularly those which are being transmitted with more power than the corresponding mobile station requires, is adjusted during a given timeslot, and in such a way, that the transmit power adjustment resembles that of a typical fading event, in terms of time of occurrence and rate of occurrence (e.g., dB per msec). In so doing, other mobile stations, using the same frequency carrier or an adjacent frequency carrier, receiving a downlink burst during that timeslot at a power level that is marginally adequate, such as mobile stations operating at or near the border of nearby cells, are better able to cope with the effects of fading, since they are subjected to less interference.

Thus, it is an object of the present invention to provide an effective power level control technique for use in TDMA based telecommunications systems.

It is another object of the present invention to provide a power level control technique that reduces interference.

It is still another object of the present invention to provide a power level control technique whereby mobile stations most susceptible to interference are not exposed to output power level changes during the timeslot in which they are receiving a downlink burst.

It is yet another object of the present invention to provide a power level control technique that improves the spectral efficiency and system capacity.

It is another object of the present invention to attenuate the power level associated with certain mobile stations during a corresponding timeslot in such a way that the mobile stations subjected to the power level attenuations are affected as little as possible.

It is another object of the present invention to attenuate the power level associated with certain mobile stations during a corresponding timeslot in such a way that the transmission quality for these mobile stations is maintained, while minimizing interference for mobile stations operating in nearby cells.

In accordance with one aspect of the present invention, the above-identified and other objects are achieved by a downlink power control method. The method involves transmitting a first downlink signal, from a base station to a first mobile station, where the first downlink signal is transmitted over a first frequency carrier and transmitted at a constant power level during a corresponding timeslot. In addition, a second downlink signal is transmitted to a second mobile station, where the second downlink signal is transmitted at an initial power level during the corresponding timeslot. The power level associated with the second downlink signal is then attenuated, wherein the attenuation of the power level associated with the second downlink signal reduces the likelihood that the second downlink signal will interfere with the first downlink signal, and wherein a signal quality associated with the second downlink signal is less likely to become unacceptable as compared to a signal quality associated with the first downlink signal, due to an attenuation in power level.

In accordance with another aspect of the present invention, the above-identified and other objects are achieved by a downlink power control method and/or apparatus. The method and/or apparatus involves transmitting a first downlink signal, from a base station to a first mobile station, where the first downlink signal is transmitted over a first frequency carrier and transmitted at a constant power level during a corresponding timeslot. A second downlink signal is then transmitted to a second mobile station, where the second downlink signal is transmitted at an initial power level during the corresponding timeslot. The power level associated with the second downlink signal is then attenuated in such a way that the attenuation of the power level associated with the second downlink signal resembles a typical fading event, where the attenuation of the power level associated with the second downlink signal reduces the likelihood that the second downlink signal will interfere with the first downlink signal.

In accordance with still another aspect of the present invention, the above-identified and other objects are achieved by a downlink power control method. This method involves transmitting from a base station to a corresponding mobile station, over a first frequency carrier, each of a number of downlink bursts at a corresponding power level during a respective timeslot. Next, a determination is made as to whether the transmit power level associated with a first downlink burst sufficiently meets the power requirements of the corresponding mobile station in the presence of fading. The transmit power associated with the first downlink burst is maintained at a constant level throughout a substantial portion of the respective timeslot, if it is determined that the transmit power level associated with the first downlink burst does not sufficiently meet the power requirements of the corresponding mobile station in the presence of fading, and the transmit power associated with the first downlink burst is attenuated during the respective timeslot, based on values associated with a typical fading event, if it is determined that the transmit power level associated with the first downlink burst sufficiently meets the power requirements of the corresponding mobile station in the presence of fading.

In accordance with still another aspect of the present invention, the above-identified and other objects are achieved by a downlink power control method that is employed by a time division multiple access based cellular radio telecommunications system, in which the time domain is divided into a plurality of time frames, and each time frame is divided into a plurality of timeslots, where each timeslot begins with a synchronization period, and where the radio telecommunications system includes a base station in radio communication with a first mobile station and a second mobile station on first and second timeslots of a carrier frequency, respectively. The method involves extracting values associated with the characteristics of a typical fading event and storing the extracted values in the base station. Next, it is determined that the second mobile station is requires a lower power level than the first mobile station. Then based on this determination, the transmit power level in the second timeslot is attenuated based on the stored values.

BRIEF DESCRIPTION OF THE DRAWINGS

The objects and advantages of the invention will be understood by reading the following detailed description in conjunction with the drawings in which.

DETAILED DESCRIPTION OF THE INVENTION

Figure 1:
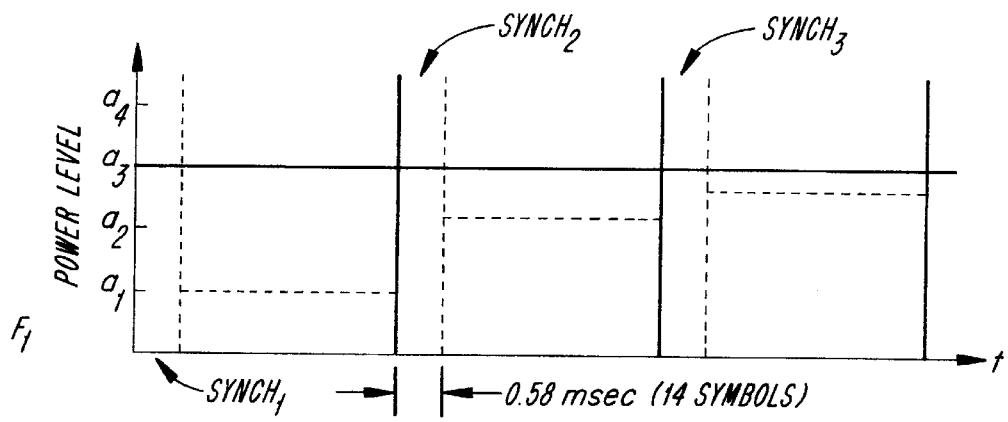
FIG. 1 illustrates the time division multiple access (TDMA) technique.
Figure 1:
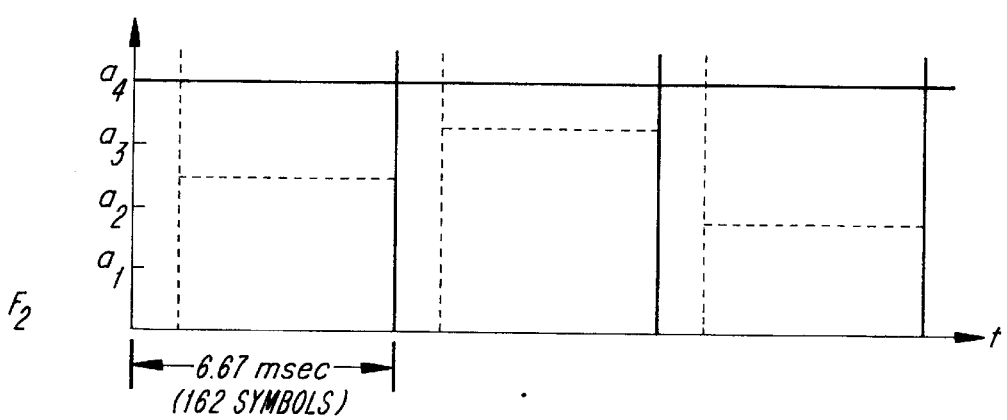
Figure 1:
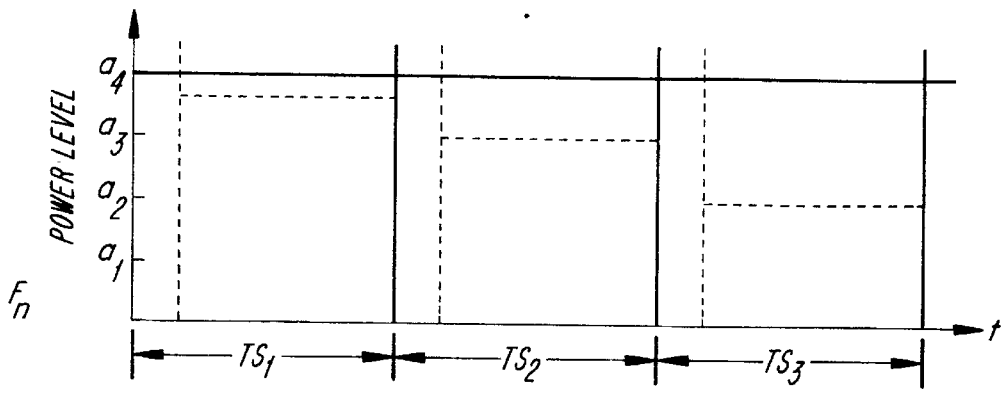

For a better understanding of the invention, the following detailed description refers to the accompanying drawings, wherein exemplary embodiments of the present invention are illustrated and described. In the figures, reference numbers and/or codes are used to identify key features of the invention. These reference numbers and/or codes appearing in the drawings are used consistently throughout the description, where and when it is appropriate.

FIG. 1 illustrates how a TDMA based radio telecommunications system operates. As shown, the time domain, for each of a number of frequency carriers $F_1 \ldots F_n$, is divided into time frames, for example, time frame TF. Each time frame is then further divided into a number of timeslots, for example, three (3) timeslots $TS_1$, $TS_2$ and $TS_3$. Accordingly, each frequency carrier $F_1 \ldots F_n$ in FIG. 1, is used to carry the communications signals for three mobile stations. Each frequency carrier—timeslot combination (e.g., frequency carrier $F_n$ and timeslot $TS_1$) thus constitutes a different physical channel, over which, a communications signal burst can be transmitted.

It is also illustrated in FIG. 1 that the duration of each timeslot $TS_1 \ldots TS_3$ is approximately 6.67 msecs, during which, 162 symbols associated with a corresponding communications signal can be transmitted. Moreover, each timeslot $TS_1 \ldots TS_3$ includes a synchronization period $SYNCH_1 \ldots SYNCH_3$. The duration of each synchronization period is approximately 0.576 msecs, during which, 14 symbols associated with the corresponding communications signal can be transmitted. Of particular importance is the fact that the power level associated with a given frequency carrier remains constant over the entire time frame TF. Thus, for example, the power level associated with frequency carrier $F_n$ remains at attenuation level a4 during the time frame as shown, despite the fact that the required power level is often less, as illustrated by the dashed, horizontal lines. It was also stated previously that the interim TDMA standards fail to provide for the modification or adjustment of power levels, particularly downlink burst power levels, during a given timeslot.

In accordance with exemplary embodiments of the present invention, the power level associated with a given downlink burst may be adjusted over the course of a single timeslot. However, only downlink bursts transmitted at a power level that substantially exceeds the needs of the corresponding mobile station are subject to modification or adjustment. In contrast, a downlink burst will be transmitted at a relatively constant power level over the duration of a timeslot, if the power level associated with the downlink burst marginally meets the power requirements of the corresponding mobile station. It should be noted that the determination as to whether a given power level substantially exceeds the needs of the corresponding mobile station or marginally meets the needs of the corresponding mobile station may be based on several factors such as signal strength and signal quality measures (e.g., bit error rate) which are reported to the base station by the mobile station. Moreover, if it is necessary to lower (i.e., attenuate) the power level of a particular downlink burst, the power level is adjusted by attenuating a corresponding power amplifier such that the rate of attenuation of the downlink power level resembles the attenuation rate of a typical fading event, wherein an artificial fading event is created with a magnitude that the corresponding mobile station can handle (i.e., an artificial fading event that does not cause the signal strength or signal quality associated with the mobile station to drop below a minimum required level).

It will be noted that the characteristics of a fading event can be measured. Thus, the characteristics associated with typical fading events are generally well known. Accordingly, the characteristics associated with a typical fading event can be simulated. In fact, vendors use these characteristics to design mobile stations that are capable of handling Rayleigh fading.

Figure 2:
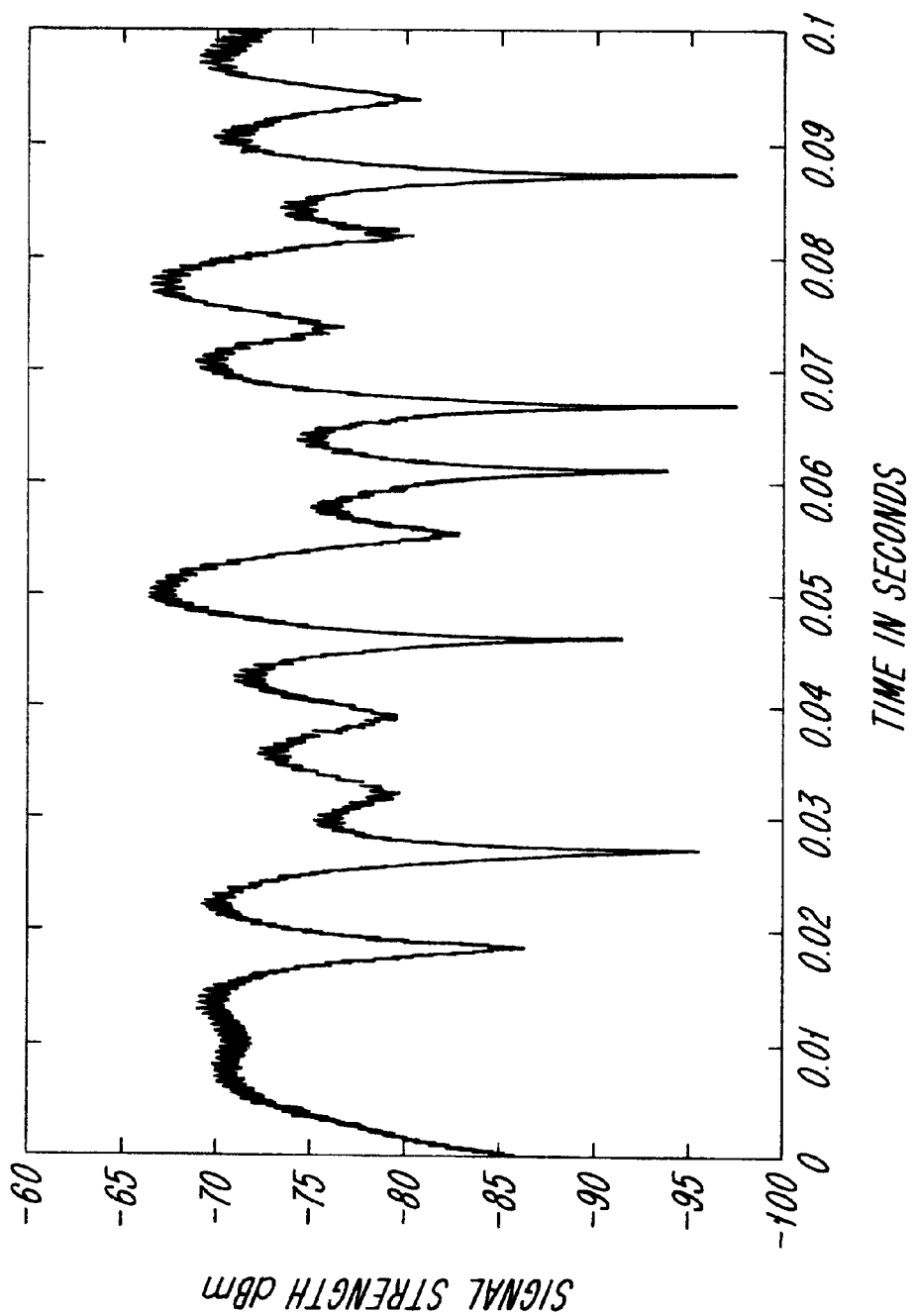
FIG. 2 illustrates the characteristics associated with a typical fading event.
Figure 3:
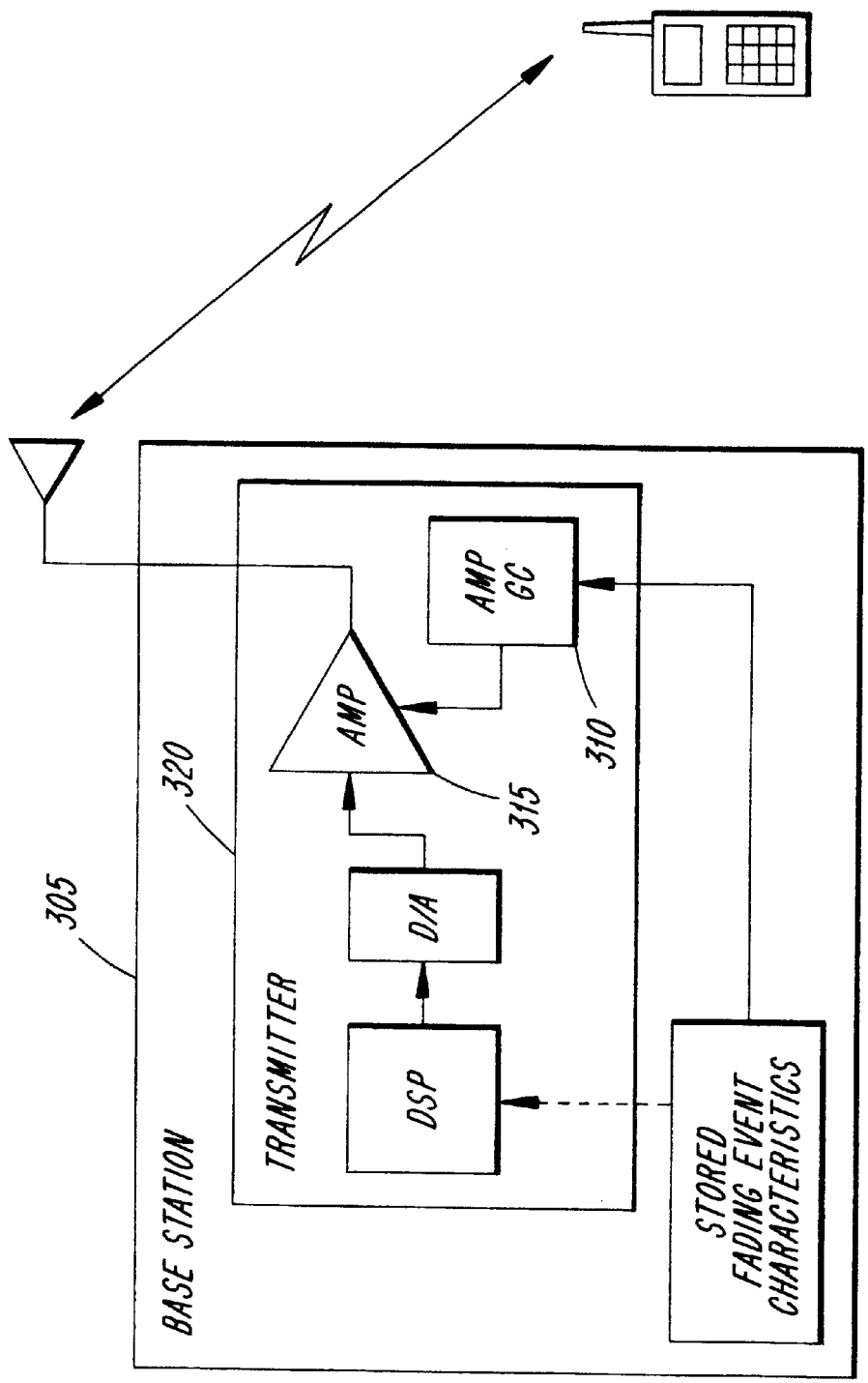
FIG. 3 illustrates the components in a base station that may be employed to implement exemplary embodiments of the present invention.

FIG. 2 illustrates an example of a typical fading pattern, comprising several fading dips, as experienced by a mobile station. Values associated with, for instance, attenuation rate, may be extracted by analyzing the fading dips, and selecting those values that best describe the profile of the fading pattern. The extracted values are then stored at the base station, for example, the base station 305 shown in FIG. 3, and thereafter, used by the amplifier gain control circuitry 310 to adjust the power amplifier 315, in transmitter unit 320, accordingly. Alternatively, the adjustment could be implemented through digital signal processing, prior to digital-to-analog conversion, as shown.

Figure 4:
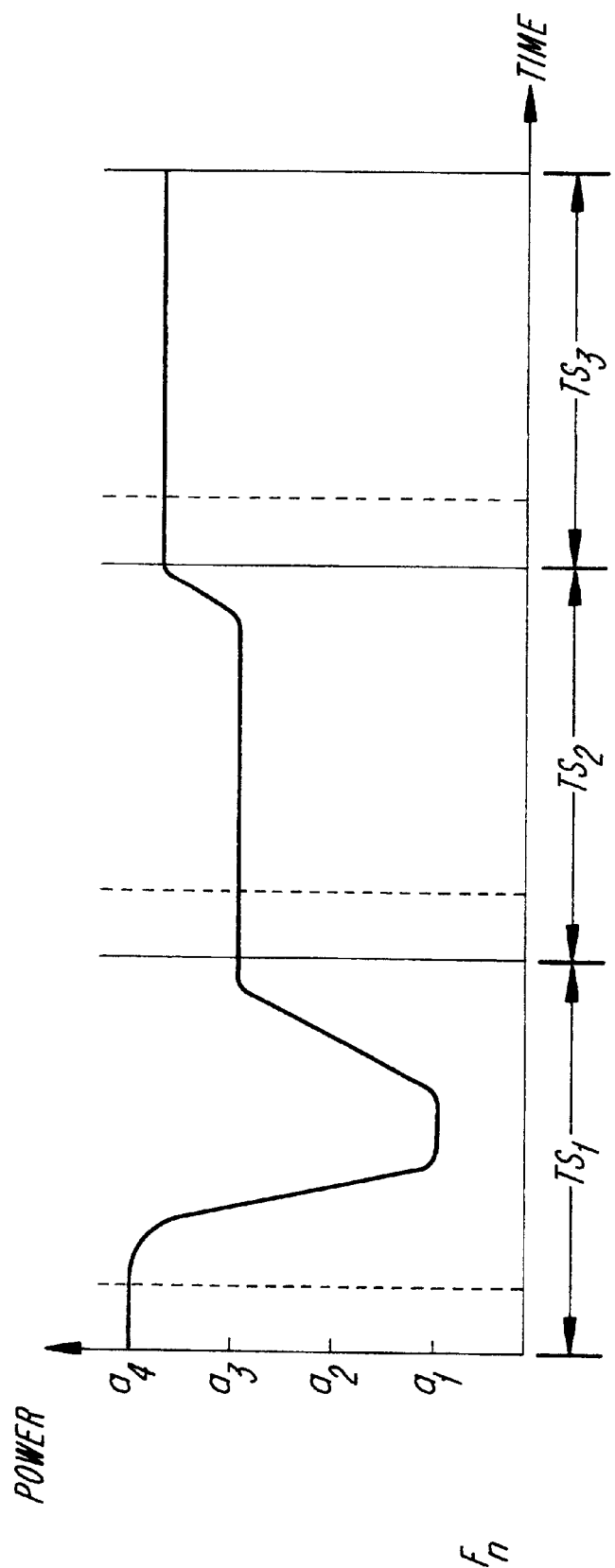
FIG. 4 illustrates a downlink power control technique in accordance with exemplary embodiments of the present invention.

FIG. 4 illustrates, in greater detail, the power control technique in accordance with exemplary embodiments of the present invention. More particularly, FIG. 4 illustrates the power control technique with respect to exemplary frequency carrier $F_n$, over a time frame TF, wherein the power level of frequency carrier $F_n$ is attenuated during timeslot $TS_1$ in order to reduce the potential that frequency carrier $F_n$ will become a source of interference for mobile stations operating over the same frequency carrier or an adjacent frequency carrier in a nearby cell during timeslot $TS_1$. If, in accordance with the present invention, a mobile station requires the power level of the downlink burst to be relatively high, then the transmit power of that downlink burst is kept at a relatively constant level over the duration of the corresponding timeslot, as illustrated, for example, by the power level associated with frequency carrier $F_n$ during timeslot $TS_3$.

If the power level of a downlink burst is to be attenuated, and the corresponding mobile station requires less power than the power level of the burst associated with the previous timeslot, then the transmit power level of the downlink burst is attenuated as is frequency carrier $F_n$ during timeslot $TS_1$ in FIG. 4, wherein the attenuation of frequency carrier $F_n$ begins after the corresponding synchronization period. Moreover, attenuating the frequency carrier $F_n$ is accomplished in such a way that it resembles the attenuation of a typical fading event (e.g., in decibels versus time), as stated above. If, however, the mobile station requires more power than the power level associated with the downlink burst of the previous timeslot, then the transmit power level is increased during the previous timeslot, such that the desired power level is achieved just before the synchronization period of the present timeslot, as is the case with frequency carrier $F_n$ during the transition from timeslot $TS_1$ to timeslot $TS_2$ in FIG. 4.

Figure 5:
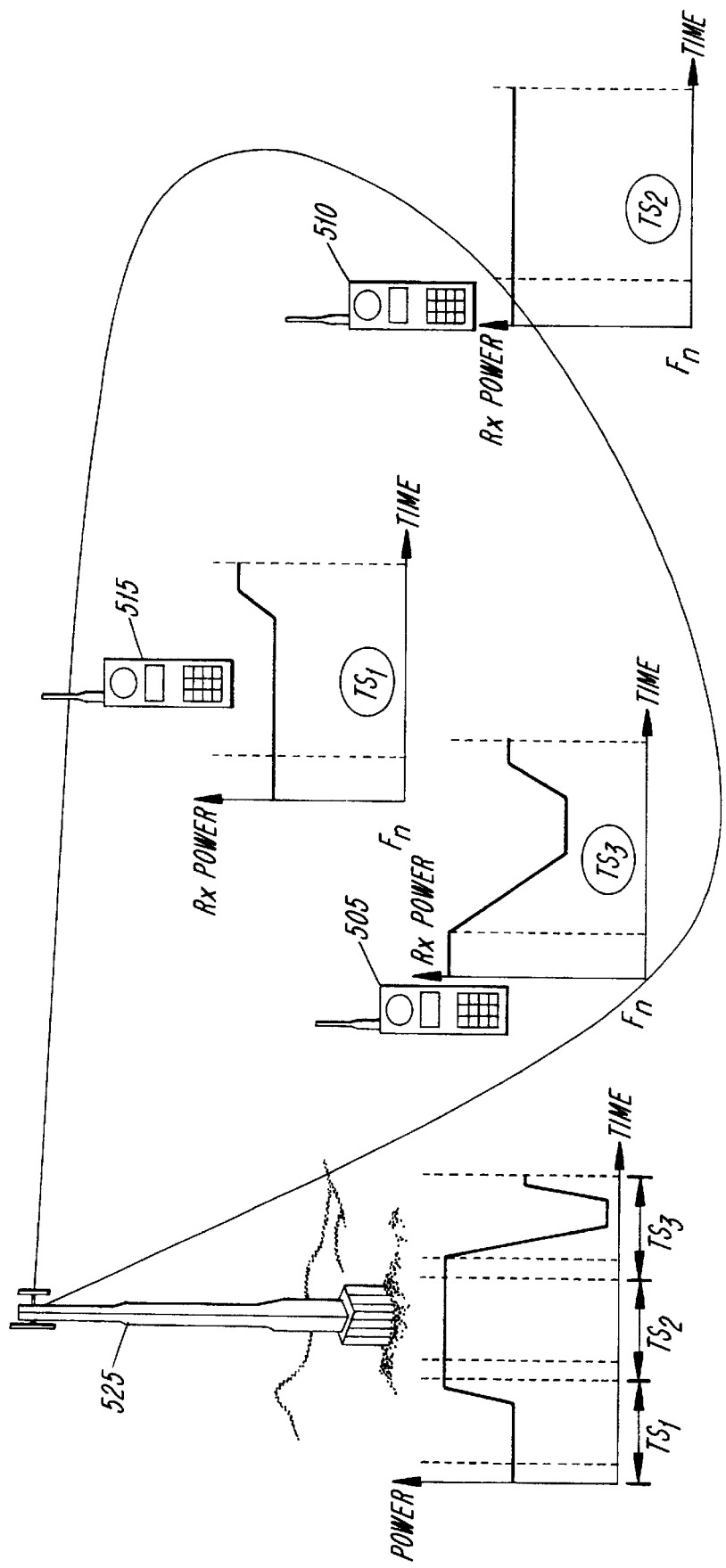
FIG. 5 is an alternative illustration of the downlink power control technique in accordance with the present invention.

FIG. 5 provides an alternative illustration of the power control technique of the present invention. As shown in FIG. 5, three (3) mobile stations 505, 510 and 515 receive a downlink burst over frequency carrier $F_n$. FIG. 5 also shows base station 525 transmitting the downlink burst associated with mobile station 505 during timeslot $TS_3$, the downlink burst associated with mobile station 510 during timeslot $TS_2$ and the downlink burst associated with mobile station 515 during timeslot $TS_1$. As one skilled in the art will readily appreciate, mobile station 510 is shown to be located in a relatively remote region of the cell (i.e., at or near the border of the cell). Hence, the transmit power during $TS_2$ is relatively high and, in accordance with exemplary embodiments of the present invention, held at a relatively constant level throughout the entire timeslot $TS_2$ In contrast, mobile station 505 is shown to be located relatively close to base station 525. Hence, the transmit power level during timeslot $TS_3$ is lower than the transmit power level during timeslot $TS_2$, as illustrated. And, in accordance with exemplary embodiments of the present invention, transition from the higher transmit power level of timeslot $TS_2$ to the lower transmit power level of timeslot $TS_3$ is achieved by attenuating the power level of the transmitted signal after the synchronization period of timeslot $TS_3$ in such a way that it resembles the attenuation rate of a typical fading event. Mobile station 515, on the other hand, is shown as being somewhat centrally located in the cell. As such, the transmit power during $TS_1$ is lower than the transmit power during timeslot $TS_2$, yet higher than the transmit power during timeslot $TS_3$. Thus, according to exemplary embodiments of the present invention, the transmit power during timeslot $TS_1$ is held constant during a substantial portion of timeslot $TS_1$, then increased so that just prior to timeslot $TS_2$, the higher transmit power level required by mobile station 510 is achieved.

Figure 6:
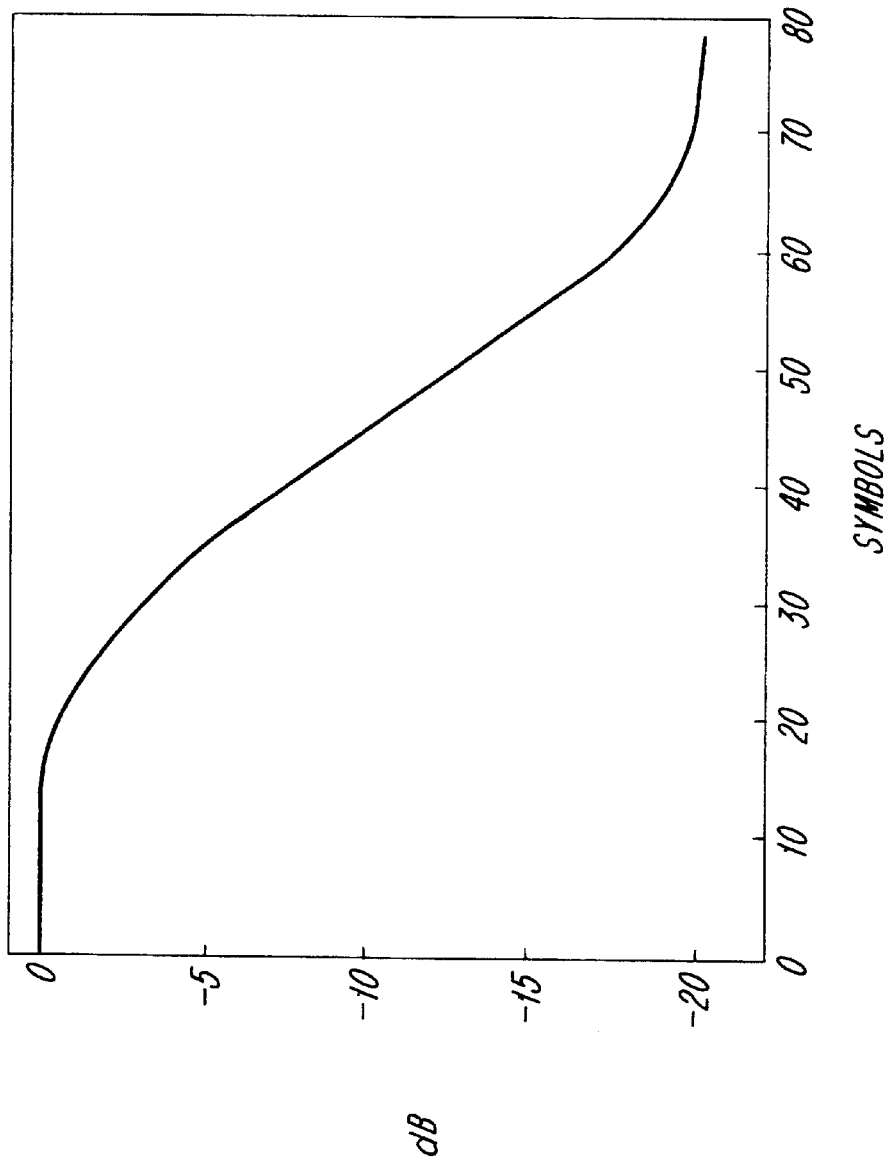
FIG. 6 illustrates, in detail, a transition in power level, in accordance with exemplary embodiments of the present invention, where the power level associated with a next timeslot is lower than the power level associated with the previous timeslot.

Further in accordance with exemplary embodiments of the present invention, FIG. 6 illustrates, in greater detail, a transition between power levels where the transition is from a higher transmit power level in a first timeslot to a lower transmit power level in a next timeslot, as is the case with the transition from timeslot $TS_2$ to timeslot $TS_3$ in FIG. 5. More specifically, FIG. 6 shows that the attenuation of the power level should be initiated approximately 15 to 18 symbols into the timeslot. Of course, if the power level is to be attenuated for the purpose of reducing any potential source of interference that might otherwise adversely affect other mobile stations, the rate at which the power level is attenuated should match the rate associated with a fading event, as stated previously.

Figure 7:
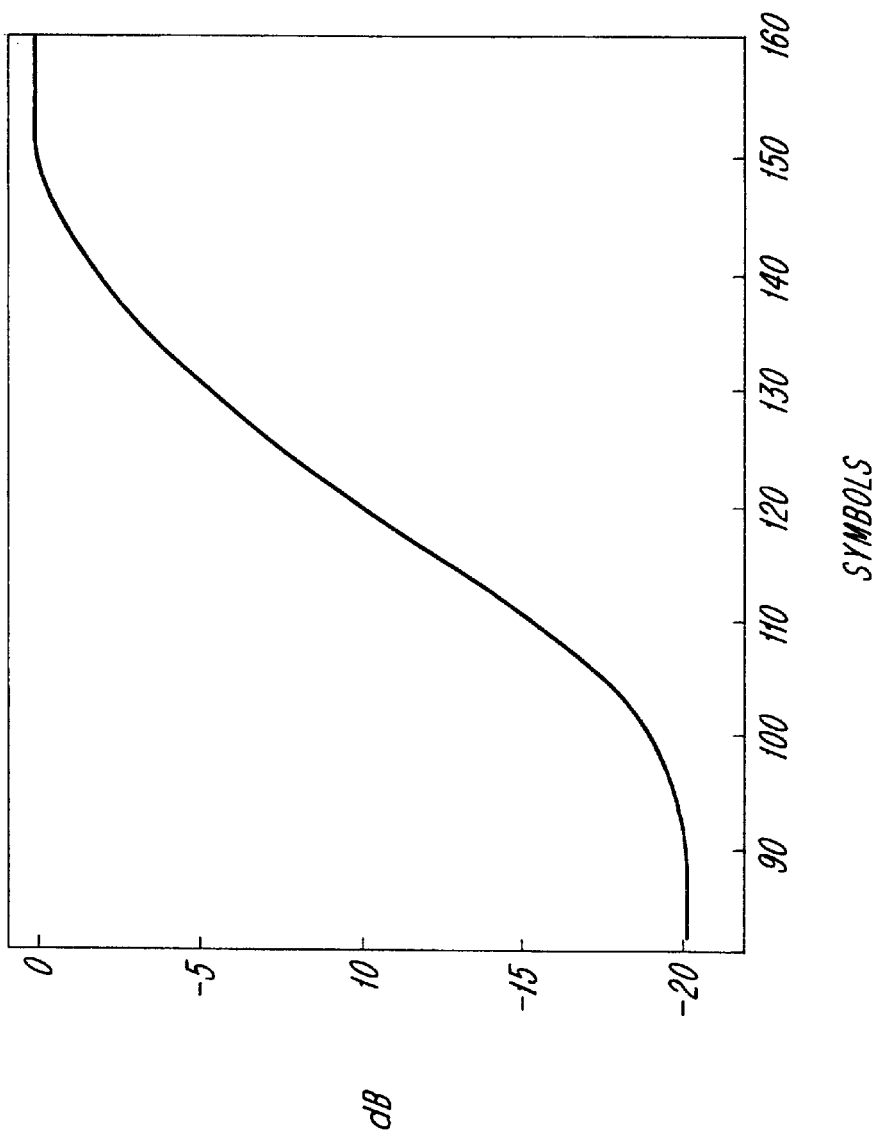
FIG. 7 illustrates, in detail, a transition in power level, in accordance with exemplary embodiments of the present invention, where the power level associated with a next timeslot is higher than the power level associated with the previous timeslot.

In contrast, FIG. 7 illustrates, in greater detail, a transition between power levels where the transition is from a lower transmit power level in a first timeslot to a higher transmit power level in a next timeslot, as is the case with the transition from timeslot $TS_1$ to timeslot $TS_2$ in FIG. 5. FIG. 7, more particularly, shows that the power level transition should be initiated in the first timeslot, for example, timeslot $TS_1$, such that the power level transition is complete prior to the end of the first timeslot.

The present invention has been described with reference to exemplary embodiments. However, it will be readily apparent to those skilled in the art that it is possible to embody the invention in specific forms other than as described above without departing from the spirit of the invention. The embodiments described above are illustrative and should not be considered restrictive in any way. The scope of the invention is given by the appended claims, rather than the preceding description, and all variations and equivalents which fall within the range of the claims are intended to be embraced therein.

What is claimed is:

1. In a time division multiple access based cellular radio telecommunications system, a downlink power control method comprising the steps of:

transmitting a first downlink signal, from a base station to a first mobile station, wherein the first downlink signal is transmitted over a first frequency carrier and transmitted at a constant power level during a corresponding timeslot;

transmitting a second downlink signal to a second mobile station, wherein the second downlink signal is transmitted at an initial power level during the corresponding timeslot; and attenuating the power level associated with the second downlink signal, wherein the attenuation of the power level associated with the second downlink signal reduces the likelihood that the second downlink signal will interfere with the first downlink signal, and wherein a signal quality associated with the second downlink signal is less likely to become unacceptable as compared to a signal quality associated with the first downlink signal, due to an attenuation in power level.

2. The downlink power control method of claim 1, where said step of attenuating the power level associated with the second downlink signal comprises the step of:

attenuating the power level associated with the second downlink signal in such a way that the attenuation of the power level associated with the second downlink signal resembles a typical fading event.

3. In a time division multiple access based cellular radio telecommunications system, a downlink power control method comprising the steps of:

transmitting a first downlink signal, from a base station to a first mobile station, wherein the first downlink signal is transmitted over a first frequency carrier and transmitted at a constant power level during a corresponding timeslot;

transmitting a second downlink signal to a second mobile station, wherein the second downlink signal is transmitted at an initial power level during the corresponding timeslot; and attenuating the power level associated with the second downlink signal in such a way that the attenuation of the power level associated with the second downlink signal resembles a typical fading event, wherein the attenuation of the power level associated with the second downlink signal reduces the likelihood that the second downlink signal will interfere with the first downlink signal.

4. The downlink power control method of claim 3, wherein said step of attenuating the power level associated with the second downlink signal comprises the step of:

attenuating the power level associated with the second downlink signal at a rate that is equivalent to a fading rate associated with the typical fading event.

5. The downlink power control method of claim 3, wherein a signal quality associated with the first downlink signal is prevented from becoming diminished, by interference, to a point where it is below an acceptable signal quality level, due to the presence of fading.

6. The downlink power control method of claim 5, wherein the signal quality associated with the first downlink signal is prevented from becoming diminished by co-channel interference.

7. The downlink power control method of claim 5 wherein the signal quality associated with the first downlink signal is prevented from becoming diminished by adjacent channel interference.

8. In a time division multiple access based cellular radio telecommunications system, in which the time domain is divided into a plurality of time frames, and each time frame is divided into a plurality of timeslots, wherein each timeslot begins with a synchronization period, a downlink power control method comprising the steps of:

transmitting, over a first frequency carrier, from a base station to a corresponding mobile station, each of a number of downlink bursts at a corresponding power level, during a respective timeslot;

determining whether the transmit power level associated with a first downlink burst sufficiently meets the power requirements of the corresponding mobile station in the presence of fading;

maintaining the transmit power associated with the first downlink burst, at a constant level throughout a substantial portion of the respective timeslot, if it is determined that the transmit power level associated with the first downlink burst does not sufficiently meet the power requirements of the corresponding mobile station in the presence of fading; and attenuating the transmit power associated with the first downlink burst during the respective timeslot, based on values associated with a typical fading event, if it is determined that the transmit power level associated with the first downlink burst sufficiently meets the power requirements of the corresponding mobile station in the presence of fading.

9. The downlink power control method of claim 8 further comprising the step of:

extracting the values associated with a typical fading event from a typical fading pattern.

10. The downlink power control method of claim 9, wherein said step of extracting the values associated with a typical fading event from a typical fading pattern comprises the step of:

extracting a value representing attenuation rate.

11. The downlink power control method of claim 8, wherein said step of maintaining the transmit power associated with the first downlink burst, at a constant level throughout a substantial portion of the respective timeslot, includes holding the power level of the first downlink burst constant during the synchronization period of the first timeslot.

12. The downlink power control method of claim 8, wherein said step of attenuating the transmit power associated with the first downlink burst during the respective timeslot comprises the step of:

reducing the power level associated with the first downlink burst in such a way that the attenuation of the transmit power resembles a typical fading event.

13. The downlink power control method of claim 12, wherein said step of reducing the power level associated with the first downlink burst comprises the step of:

reducing the power level associated with the first downlink burst at an attenuation rate that corresponds with an attenuation rate associated with the typical fading event.

14. The downlink power control method of claim 12, wherein said step of reducing the power level associated with the first downlink burst comprises the step of:

initiating the reduction in power level after the synchronization period of the first timeslot.

15. The downlink power control method of claim 8 further comprising the step of:

increasing the transmit power of a second downlink burst during a second timeslot if the transmit power of a third downlink burst during a next timeslot is greater than the transmit power of the second downlink burst, such that the transmit power associated with the third downlink burst is achieved prior to the synchronization period of the next timeslot.

16. The downlink power control method of claim 15 further comprising the step of:

holding the transmit power at a constant level throughout the synchronization period of the next time slot.

17. The downlink power control method of claim 8 further comprising the step of:

decreasing the transmit power of a second downlink burst after the synchronization period of a second timeslot, corresponding to the second downlink burst, if the transmit power of a third downlink burst during the timeslot previous to the second timeslot is greater than the transmit power of the second downlink burst.

18. In a time division multiple access based cellular radio telecommunications system, in which the time domain is divided into a plurality of time frames, and each time frame is divided into a plurality of timeslots, wherein each timeslot begins with a synchronization period, and wherein said radio telecommunications system includes a base station in radio communication with a first mobile station and a second mobile station on first and second timeslots of a carrier frequency, respectively, a downlink power control method comprising the steps of:

extracting values associated with characteristics of a typical fading event;

storing the extracted values in the base station;

determining that the second mobile station requires a lower power level than the first mobile station; and attenuating the transmit power level in the second timeslot based on the stored values, wherein said step of attenuating the transmit power level is initiated after a synchronization period of the second time slot.

19. The downlink power control method of claim 18, wherein said step of determining that the second mobile station requires a lower power level than the first mobile station comprises the step of:

measuring signal quality as received by the second mobile station.

20. The downlink power control method of claim 18, wherein said step of extracting values associated with the characteristics of a typical fading event comprises the step of:

extracting attenuation rate.

21. In a time division multiple access based cellular radio telecommunications system, in which the time domain is divided into a plurality of time frames, and each time frame is divided into a plurality of timeslots, wherein each timeslot begins with a synchronization period, and wherein said radio telecommunications system includes a base station in radio communication with a first mobile station on a first timeslot of a carrier frequency, a second mobile station on a second timeslot of the carrier frequency and a third mobile station on a third timeslot of the carrier frequency, a downlink power control method comprising the steps of:

extracting values associated with characteristics of a typical fading event;

storing the extracted values in the base station;

determining that the second mobile station requires a lower power level than the first mobile station;

attenuating the transmit power level in the second timeslot based on the stored values;

determining that the third mobile station requires a higher power level than the second mobile station; and increasing the power level prior to the synchronization period of the third timeslot.

22. In a time division multiple access based cellular radio telecommunications system, an apparatus for downlink power control comprising:

means for transmitting a first downlink signal, from a base station to a first mobile station, wherein the first downlink signal is transmitted over a first frequency carrier and transmitted at a constant power level during a corresponding timeslot;

means for transmitting a second downlink signal to a second mobile station, wherein the second downlink signal is transmitted at an initial power level during the corresponding timeslot; and means for attenuating the power level associated with the second downlink signal in such a way that the attenuation of the power level associated with the second downlink signal resembles a typical fading event, wherein the attenuation of the power level associated with the second downlink signal reduces the likelihood that the second downlink signal will interfere with the first downlink signal.

23. The apparatus of claim 22, wherein said means for attenuating the power level associated with the second downlink signal comprises:

means for attenuating the power level associated with the second downlink signal at a rate that is equivalent to a fading rate associated with the typical fading event.

24. The apparatus of claim 22, wherein a signal quality associated with the first downlink signal is prevented from becoming diminished, by interference, to a point where it is below an acceptable signal quality level, due to the presence of fading.

25. The apparatus of claim 24, wherein the signal quality associated with the first downlink signal is prevented from becoming diminished by co-channel interference.

26. The apparatus of claim 24, wherein the signal quality associated with the first downlink signal is prevented from becoming diminished by adjacent channel interference.

* * * * *